A. F. NORTON.
POT COVER.
APPLICATION FILED JAN. 20, 1908.

908,121.

Patented Dec. 29, 1908.

Witnesses:

Inventor.
Aaron F. Norton

UNITED STATES PATENT OFFICE.

AARON F. NORTON, OF LOS ANGELES, CALIFORNIA.

POT-COVER.

No. 908,121.   Specification of Letters Patent.   Patented Dec. 29, 1908.

Application filed January 20, 1908. Serial No. 411,800.

*To all whom it may concern:*

Be it known that I, AARON F. NORTON, a citizen of the United States, residing at Los Angeles, in the county of Los Angeles and State of California, have invented a new and useful Pot-Cover, of which the following is a specification.

This invention relates to a device for use as a cover for pots, pans or kettles, and its object is to provide a device for this purpose which can be attached to or detached from the utensil which it covers.

A further object of the invention is to provide a pot cover which can be attached to the pot in such manner that it will serve as a means for lifting the pot. In this connection I prefer to provide a separable handle for detachable connection to the cover to grip the same in lifting the cover and pot.

Another object of the invention is to provide means for pouring out the contents of the pot while the cover is on.

Figure 1:
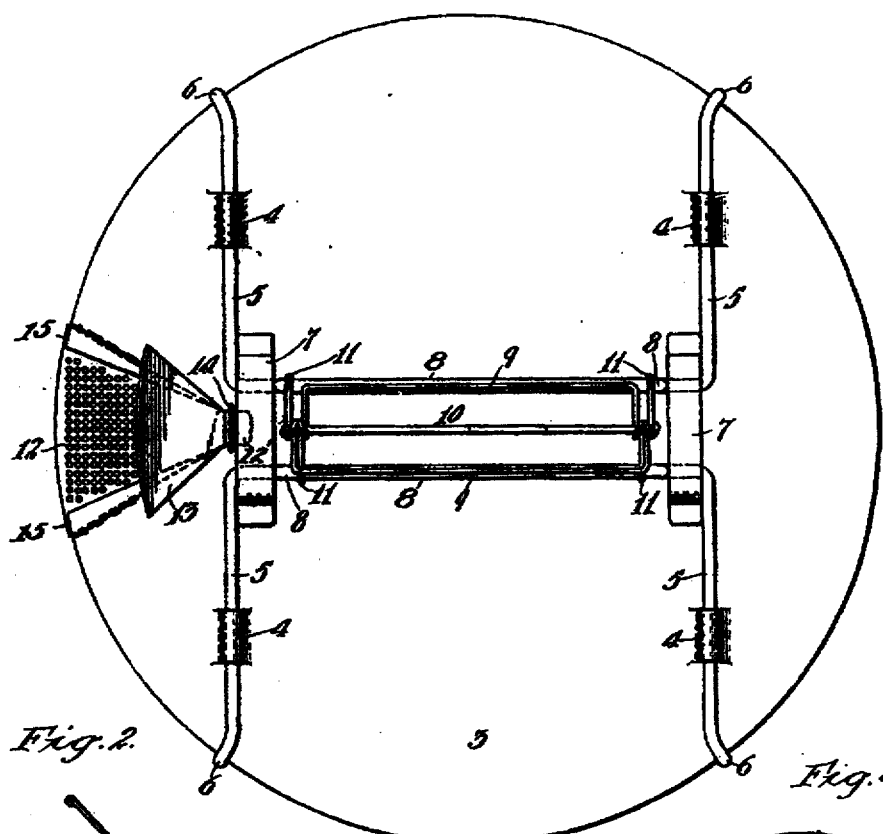
Figure 2:
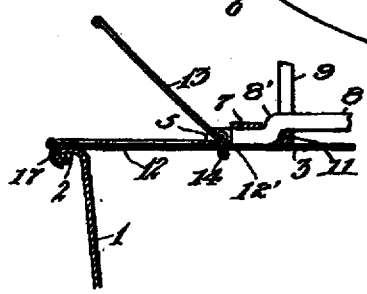
Figure 4:
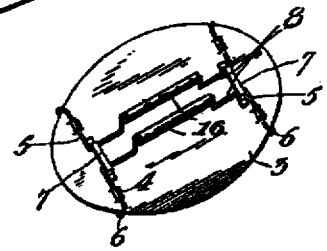
Figure 3:
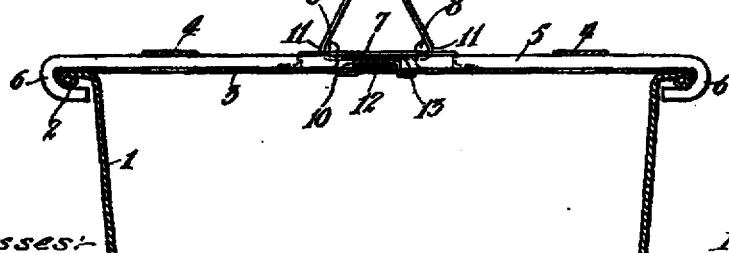

In the accompanying drawings:—Figure 1 is a plan of the cover in place on the pot. Fig. 2 is a vertical section of a pot with cover attached. Fig. 3 is a partial vertical section showing the pouring spout. Fig. 4 is a perspective of a modified form of the cover.

1 designates a pot, pan or kettle having a turned over bead or flange 2 at the upper end, the invention being applicable to any pot, pan or kettle having such flange around its top, or to a pot without a flange by punching holes in the pot at the point of contact with the hooks.

3 designates the cover made of sheet metal of sufficient size to cover the class of pots or pans for which it is intended, said cover being formed with guides 4 as by stamping up portions of the cover out of the plane thereof, in which slide what I shall call the sides of U-shaped bails or members 5 having hooks 6 at their ends which extend downwardly under the cover and are adapted to extend under the flange 2 of the pot or pan when the cover is placed on the pan and the members drawn inwardly. The cover is further provided with straps 7 attached thereto in the form of long flat loops which extend up over the middle portions 8 of the members 5, said strips 7 being long enough to allow the in and out movement of the sides of said members 5 and being preferably placed so that their edges engage the members 5 in the top thereof to aid in guiding said members. The middle portions 8 of the two members 5 are parallel to one another, and bent upwardly a short distance at each end adjacent to the straps 7, as shown at 8' for the reception of means which are provided for grasping said middle portions to lift the cover, said means consisting of two bails 9 crossing one another and pivoted together on a longitudinal bar 10, said bails having hooks 11 at their lower ends adapted to engage under the portions 8 of members 5, and between said portions and the cover so that by spreading the bails and inserting said hooks under the members 8, and then drawing the bails 9 together, the hooks 11 at their lower ends are caused to grip under the portions 8 of members 5, the bails 9 then serving as a handle for the cover. The cover may be operated without the detachable handle by having the members 8 raised high enough to form handles 16 after leaving the guide straps 7, as shown in Fig. 4.

The cover may be provided at one side with means for pouring out and if desired straining the contents of the pot or pan while the cover is on. For this purpose a portion of the cover is cut out, as shown at 12, and a lid or closure 13 pivoted at 14 to the cover, serves when turned down to close the opening. Wire, or coarse straining means 12 may be removably inserted over the opening, under the pivot at 14 and to fit under the edge of the cover at 15.

The cut out portion of the cover is preferably V-shaped and the strainer is V-shaped to correspond therewith but is somewhat wider and is preferably provided with a tongue 12' at its rear end which is preferably bent slightly upward out of the plane of the strainer and is adapted to be slipped in between the bail like pivot 14 and the top of the cover. The outer edge of the strainer is preferably curved as shown at 17 so as to engage with the rim of the vessel to which it is applied. The sides of the strainer fit under the edges of the V which are bent up out of the plane of the cover to receive them and thereby cause the strainer to be firmly held in position.

The cut out portion of the cover and the strainer are preferably located at one end of the handles or portions 8 so that when it is desired to tilt the vessel to pour off the liquid, it can be readily done by the lifters 9, as their engagement with the shoulders 8' will prevent any slippage and the strain will come equally upon both of the handles or lifters which would not be the case if the V were so placed as would cause the strain upon the handles to be sidewise. It also permits of the hinge of the lid 13 being placed adjacent to one of the loops 7 so that it will be protected thereby and not be so apt to be broken or damaged The device is used as follows: When it is desired to apply a cover to a pan or pot the members 5 on the said cover are spread apart and a handle means 9, 9, 10 is grasped in the hand, the hand passing between the bar 10 and the upper portions of the bails 9 and the bails being spread apart by the fingers so that the hooks on the lower portions thereof are separated sufficiently to enable the said hooks to press down on each side of the portions 8 of members 5 on the cover. The hand is then closed on the upper portions of bail members 9 causing the hooks on the lower ends thereof to engage under the said portions 8, so that the cover can be lifted by means of the handle, the bail members 9 being drawn together just sufficiently to engage them with the members 5, but not to draw the members 5 inwardly. The cover may now be lifted by means of the handle and transferred to any pot or pan of suitable size, the hooks 6 on the members 5 passing down outside of the flange 2 on the pot or pan, and then by drawing in on the bail members 9 of the handle means the hooks 11 on the lower edges thereof are caused to draw the members 5 inwardly so that their hooks 6 engage and grip under the flange 2 of the pot or pan, and as long as the handle is tightly grasped in the hand the handle means, the cover, and pot or pan are maintained in rigid connection, so that they can be handled as one and the pot or pan can be set on or off the stove or tipped over for pouring in the most convenient and expeditious manner and without the use of any stove cloth or means to protect the hand as the handle means 9, 9, 10 is always cool. Having placed the pot on the stove, the handle means can be withdrawn, if desired, and can be replaced on the cover in engagement with the cover whenever desired. To remove the lid it is only necessary to spread the members 5 apart and then lift it by means of the handle means or otherwise.

What I claim is:

1. A cover for vessels having a notch cut in its edge, a hinged lid for the notch, a strainer adapted to be removably seated in said notch, having a tongue at its inner end adapted to be passed between and clamped by said hinge and the cover so as to retain the strainer in said notch, and clamping means for securing the cover to a vessel.

2. A cover for vessels having a V-shaped notch in its edge with the edges of the V bent upwardly, a loop like bail at the inner end of the notch, a V-shaped lid for the notch pivotally secured to the bail, a V-shaped strainer for the notch having its edges adapted to be placed under the upturned edges of the notch and having a tongue at its inner end adapted to be passed between said hinge and the cover, and clamping means for securing the cover in position.

3. A cover for vessels having a notch in its edge, oppositely extending clamping means thereon, each clamp comprising a U-shaped bail having its middle portion raised above the cover and shouldered near each end and the outer ends of its sides bent downwardly to form hooks, flat loops over the ends of said middle portions between the sides of the bails and said shoulders, lifting means provided with hooked portions adapted to detachably engage with said middle portions, and a lid hinged to the cover in position to cover said notch.

In testimony whereof, I have hereunto set my hand at Los Angeles, Cal., this 10th day of January 1908.

AARON F. NORTON.

In presence of—
GEORGE T. HACKLEY,
FRANK L. A. GRAHAM.